(12) United States Patent
Mackey

(10) Patent No.: US 7,463,246 B2
(45) Date of Patent: Dec. 9, 2008

(54) CAPACITIVE SENSING DEVICE

(75) Inventor: Bob Lee Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 843 days.

(21) Appl. No.: 10/407,696

(22) Filed: Apr. 3, 2003

(65) Prior Publication Data

US 2003/0234770 A1    Dec. 25, 2003

Related U.S. Application Data

(60) Provisional application No. 60/391,686, filed on Jun. 25, 2002.

(51) Int. Cl.
*G09G 5/00* (2006.01)
(52) U.S. Cl. ............... 345/173; 345/174; 178/18.06
(58) Field of Classification Search ......... 345/173–179; 178/18.01–18.11, 19.01–19.07
See application file for complete search history.

(56) References Cited

U.S. PATENT DOCUMENTS

| | | | |
|---|---|---|---|
| 4,954,823 A | 9/1990 | Binstead | 341/26 |
| 5,283,556 A | 2/1994 | Ise | 345/174 |
| 5,844,506 A | 12/1998 | Binstead | 341/34 |
| 5,847,690 A | 12/1998 | Boie et al. | 345/104 |
| 5,952,998 A | 9/1999 | Clancy et al. | 345/173 |
| 5,963,277 A | 10/1999 | Kim et al. | 349/12 |
| 6,137,427 A | 10/2000 | Binstead | 341/33 |
| 6,177,918 B1 | 1/2001 | Colgan et al. | 345/87 |
| 6,204,897 B1 | 3/2001 | Colgan et al. | 349/12 |

FOREIGN PATENT DOCUMENTS

WO    WO 01/27868    4/2001

*Primary Examiner*—Regina Liang

(57) ABSTRACT

One embodiment in accordance with the present invention includes a capacitive sensing device. The capacitive sensing device comprises a substantially transparent substrate and a set of patterned conductive traces formed above the substantially transparent substrate. Each of the set of patterned conductive traces has a width such that the capacitive sensing device does not have to be arranged with respect to an underlying image in order to avoid deleterious obstruction of the underlying image by the set of patterned conductive traces. The underlying image is separate from the capacitive sensing device. The capacitive sensing device is separate from active components used to comprise an information display device.

50 Claims, 10 Drawing Sheets

CAPACITIVE SENSING DEVICE

CROSS REFERENCE TO RELATED APPLICATIONS

This application claims priority to the U.S. Provisional Patent Application No. 60/391,686 entitled "Touchscreen Thin Film Capacitive Sensor" by Bob Mackey, filed Jun. 25, 2002.

BACKGROUND

Computing devices have become integral tools used in a wide variety of different applications, such as in finance and commercial transactions, computer-aided design and manufacturing, health care, telecommunication, education, etc. Computing devices are finding new applications as a result of advances in hardware technology and rapid development in software technology. Furthermore, the functionality of a computing device is dramatically enhanced by coupling these types of stand-alone devices together in order to form a networking environment. Within a networking environment, computing device users may readily exchange files, share information stored on a common database, pool resources, and communicate via electronic mail (e-mail) and video teleconferencing.

Conventional computing devices provide several ways for enabling a user to input a choice or a selection. For example, a user can use one or more keys of an alphanumeric keyboard communicatively connected to the computing device in order to indicate a choice or selection. Additionally, a user can use a cursor control device communicatively connected to the computing device to indicate a choice. Also, a user can use a microphone communicatively connected to the computing device to audibly indicate a particular selection. Moreover, touch sensing technology can be used to provide an input selection to a computing device or other electronic device.

Within the broad category of touch sensing technology there exist capacitive sensing touch screens. Among commercially available capacitive sensing touch screens, there are different sensing technologies. For example, one sensing technology involves the use of a uniform resistive sheet as part of the capacitive sensing touch screen. However, there are disadvantages associated with this commercially available uniform resistive sheet sensing technology. For instance, one of the disadvantages is that when an image is shown through the uniform resistive sheet, the reduced transmittance due to the optically absorbing resistive sheet optically degrades the image. If the image is shown on a display, the display has to be operated at higher brightness to compensate, which requires more power and reduces battery life.

Another commercially available sensing technology involves using rolled out wires attached to glass as part of a capacitive sensing touch screen. However, there are also disadvantages associated with this commercially available sensing technology. For example, one of the disadvantages is that the wires of the capacitive sensing touch screen are very visible when a displayed image is viewed through it. As such, the wires can be distracting to a user. Another disadvantage is that the wires tend to reflect unwanted ambient light towards the user, thereby obscuring the display. Consequently, the degraded image due to the obscured display can be distracting to the user.

The present invention may address one or more of the above issues.

SUMMARY

One embodiment in accordance with the present invention includes a capacitive sensing device. The capacitive sensing device comprises a substantially transparent substrate and a set of patterned conductive traces formed above the substantially transparent substrate. Each of the set of patterned conductive traces has a width such that the capacitive sensing device does not have to be arranged with respect to an underlying image in order to avoid deleterious obstruction of the underlying image by the set of patterned conductive traces. The underlying image is separate from the capacitive sensing device. The capacitive sensing device is separate from active components used to comprise an information display device.

The drawings referred to in this description should not be understood as being drawn to scale except if specifically noted.

DESCRIPTION OF PREFERRED EMBODIMENTS

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
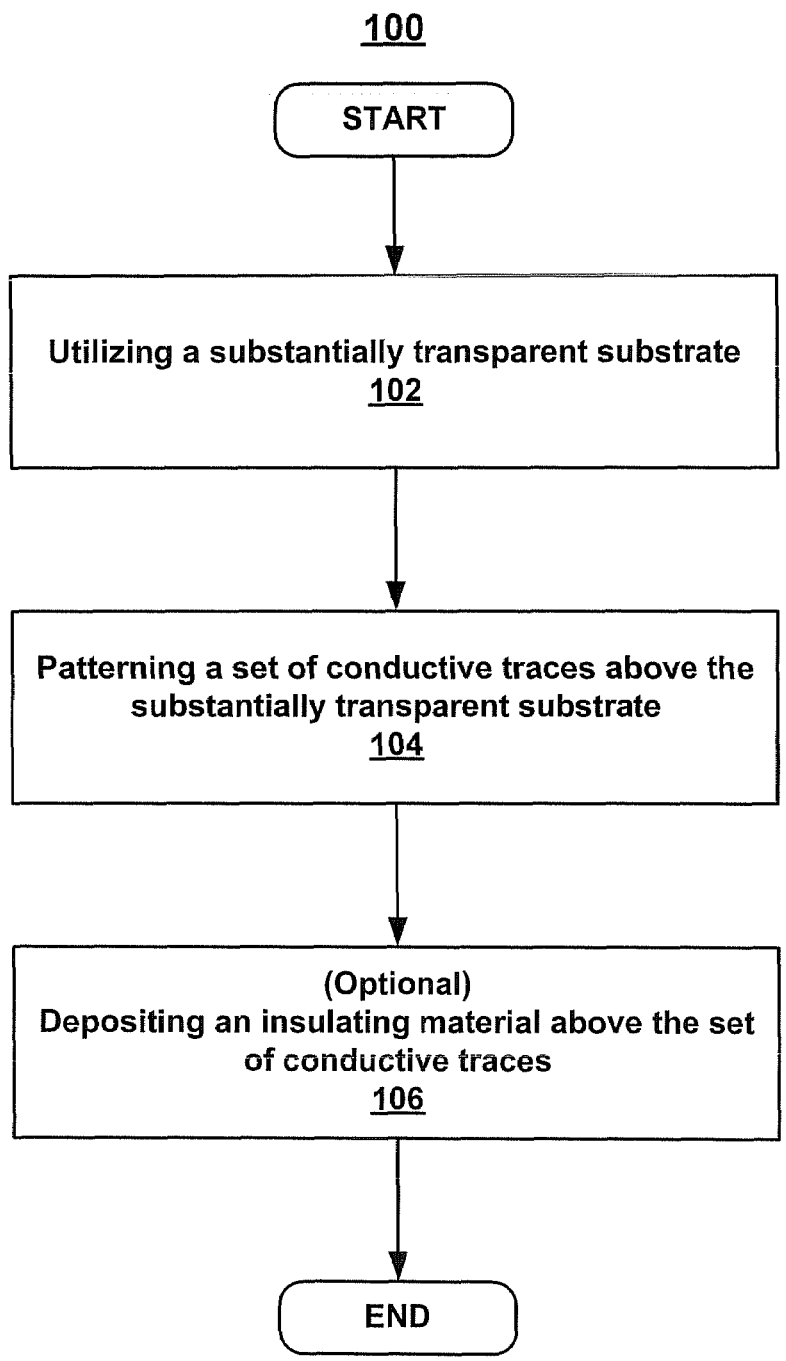
FIG. 1 is a flowchart of operations performed in accordance with an embodiment of the present invention for fabricating a capacitive sensing device.

FIG. 1 is a flowchart 100 of operations performed in accordance with an embodiment of the present invention for fabricating a capacitive sensing device. Although specific operations are disclosed in flowchart 100, such operations are exemplary. That is, the present embodiment is well suited to performing various other operations or variations of the operations recited in FIG. 1.

The present embodiment provides a method for fabricating a capacitive sensing device. For example, a substantially transparent substrate (e.g., a glass, a plastic or a crystalline material) is utilized to fabricate the capacitive sensing device. A set of conductive traces is patterned above the substantially transparent substrate. Optionally, an insulating material can be deposited above the set of conductive traces. In one embodiment, the insulating material may act as protection for the set of conductive traces and also provide them electrical insulation from the outside world.

At operation 102 of FIG. 1, a substantially transparent substrate is utilized to fabricate a capacitive sensing device. It is noted that the substantially transparent substrate may include a wide variety of materials in accordance with the present embodiment. For example, the substantially transparent substrate may include, but is not limited to, a glass, a plastic or a crystalline material. Additionally, the substantially transparent substrate may be a component of an information display device. For example, the substantially transparent substrate can be implemented as a part of a casing or front cover of the information display device.

At operation 104, a set of conductive traces are patterned above the substantially transparent substrate. It is understood that the set of conductive traces may be implemented in diverse ways. For example, each of the set of conductive traces can have a width such that the capacitive sensing device does not have to be arranged with respect to an underlying image in order to avoid deleterious obstruction of that underlying image by the set of conductive traces. It is appreciated that the underlying image is separate from the capacitive sensing device and may be displayed on an information display device. Furthermore, the underlying image is not a component of the capacitive sensing device. Additionally, the capacitive sensing device is fabricated separately from active components of an information display device.

The patterning of the set of conductive traces may be implemented in a wide variety of ways at operation 104. For example, the patterning of the set of conductive traces can include, but is not limited to, a lithographic process, a printing process, electron beam lithography, screen printing, inkjet printing, offset printing, electroplating, stamping, and LIGA. It is noted that LIGA is the German abbreviation for LIthografie Galvanoformung Abformung which in English means lithographic :electrodeposition. Furthermore, the patterning of the set of conductive traces can include patterning a landing pad region above the substantially transparent substrate to enable coupling of one or more sensing circuit components to the substantially transparent substrate. For example, the landing pad region may include wiring for coupling integrated circuit (IC) chips, capacitors, resistors, connectors and other electronic components to the substantially transparent substrate. Additionally, to promote solderability, the landing pad region can be plated with gold, tin, copper or any other metal that is compatible with solder. Moreover, many processes can be used to assemble the capacitive sensing device with its circuit components. One example would be to screen print solder paste onto the appropriate wiring pads and then place the components. The assembly can then be heated to re-flow the solder, bonding the circuit components securely to the substantially transparent substrate.

At operation 104 of FIG. 1, the set of conductive traces may be implemented in diverse ways. For example, the set of conductive traces can include one or more layers of material. The set of conductive traces can include substantially opaque material and/or substantially non-reflective material. Furthermore, the set of conductive traces can be formed of at least one layer of material that is substantially non-reflective. It is noted that by locating a substantially opaque, non-reflective material such that it faces a user of the capacitive sensing device, it can optically obscure from the user any reflective materials included as part of the set of conductive traces. In this manner, the substantially non-reflective material makes the set of conductive traces more difficult to see by the user. It is noted that the set of conductive traces can include at least one layer of substantially opaque material.

Additionally, the set of conductive traces can be patterned such that each of the conductive traces has a width less than approximately 12 micrometers. It is noted that the width of each conductive trace can be understood to mean the width of each individual conductive element of the set of conductive traces. In this manner, when a user is approximately at arm's length from the capacitive sensing device, the user's eyes are substantially unable to view the set of conductive traces of the capacitive sensing device. It is understood that by decreasing the width of each trace of the set of conductive traces, there is a point at which they are no longer resolvable by a human eye. In this fashion, there is no deleterious obstruction of an underlying image by the set of conductive traces of the capacitive sensing device. Moreover, the set of conductive traces can be patterned at operation 104 such that each of them has a width that is substantially non-perceptible by a human user. Therefore, the set of conductive traces can be patterned such that each of them has a width such that each of them is not required to be formed of a substantially transparent material. Moreover, each of the set of conductive traces can have a width less than a pixel width of the underlying image. Also, each of the set of conductive traces can be a capacitive sensing element. It is noted that the set of conductive traces at operation 104 are not limited in any way to these different embodiments.

At operation 106, an insulating material is deposited above the set of conductive traces. It is noted that the insulating material deposited at operation 106 can act as protection (e.g., from handling damage) for the set of conductive traces and also provide them electrical insulation from the outside world. As such, the deposition of the insulating material at operation 106 may be an optional operation of flowchart 100. The deposition of the insulating material at operation 106 may be implemented in diverse ways. For example, at operation 106, a deposition of a dielectric layer (e.g., $SiO_2$, Spin-On-Glass, and the like) can be used as the insulating material. It is appreciated that the insulating material at operation 106 may include a substantially transparent insulating material or an opaque insulating material. Additionally, the insulating material may be deposited at operation 106 to cover the entire set of conductive traces or it may be deposited to cover one or more portions of the set of conductive traces. At the completion of operation 106, the process exits flowchart 100.

Figure 2:
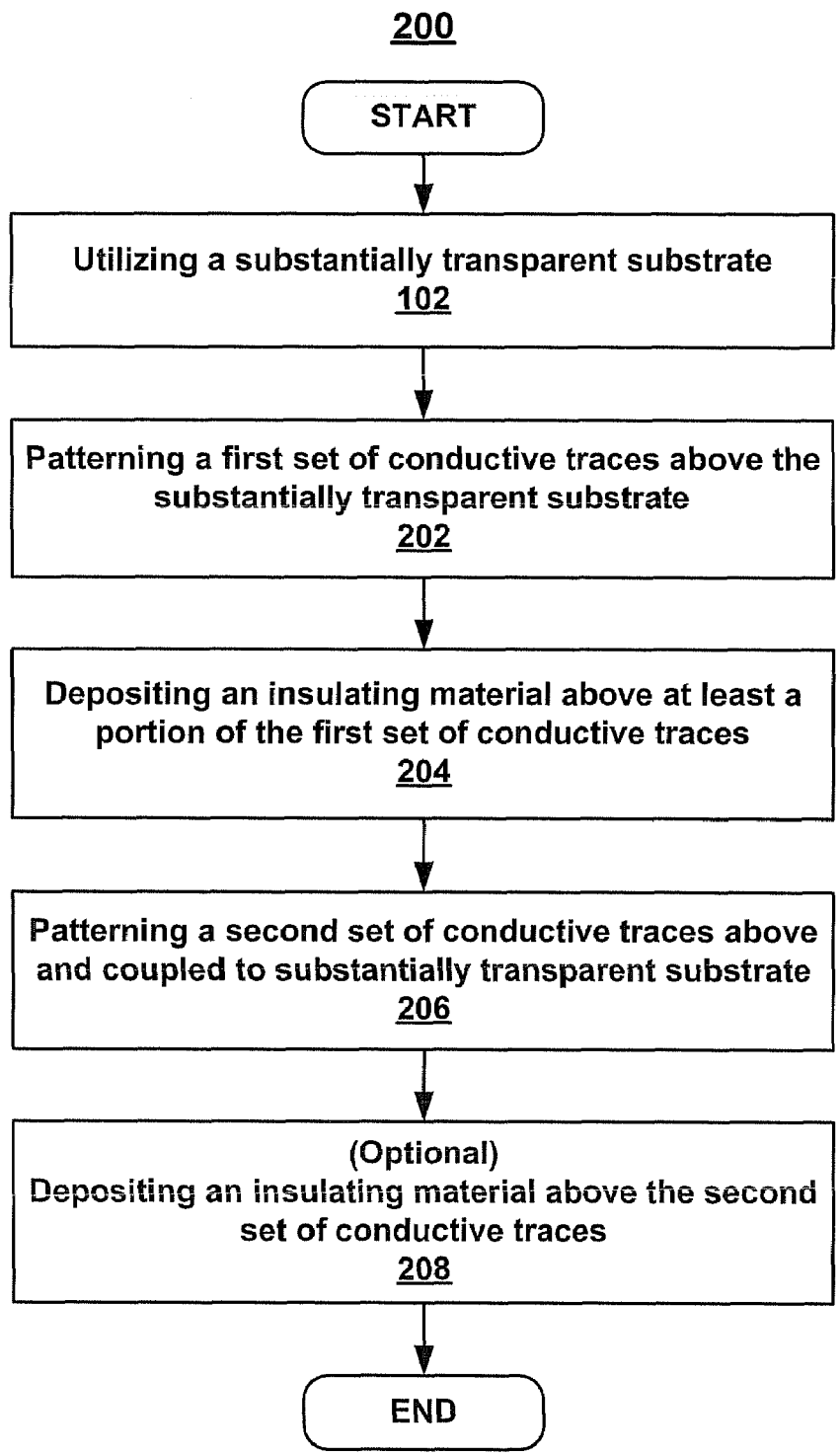
FIG. 2 is a flowchart of operations performed in accordance with another embodiment of the present invention for fabricating a capacitive sensing device.

FIG. 2 is a flowchart 200 of operations performed in accordance with an embodiment of the present invention for fabricating a capacitive sensing device. Although specific operations are disclosed in flowchart 200, such operations are exemplary. That is, the present embodiment is well suited to performing various other operations or variations of the operations recited in FIG. 2.

The present embodiment provides a method for fabricating a capacitive sensing device that includes two sets of conductive traces. For example, a substantially transparent substrate (e.g., a glass, a plastic or a crystalline material) is utilized to fabricate the capacitive sensing device. A first set of conductive traces is patterned above the substantially transparent substrate. A first insulating material is deposited above the first set of conductive traces. Furthermore, a second set of conductive traces is patterned above and coupled to the substantially transparent substrate. Optionally, a second insulating material can be deposited above the second set of conductive traces. In one embodiment, the second insulating material may act as protection for the first and second sets of conductive traces and may also provide them electrical insulation from the outside world.

At operation 102 of FIG. 2, a substantially transparent substrate is utilized to fabricate a capacitive sensing device. It is noted that the substantially transparent substrate may include a wide variety of materials in accordance with the present embodiment. It is appreciated that the substantially transparent substrate at operation 102 can be implemented in any manner similar to operation 102 of FIG. 1, described herein.

At operation 202, a first set of conductive traces are patterned above the substantially transparent substrate. It is understood that the first set of conductive traces may be implemented in diverse ways at operation 202. For example, the first set of conductive traces can be implemented in any manner similar to the set of conductive traces at operation 104, described herein.

At operation 204 of FIG. 2, a first insulating material is deposited above the first set of conductive traces. The deposition of the first insulating material at operation 204 may be implemented in a wide variety of ways. For example, the deposition of the first insulating material at operation 204 can be implemented in any manner similar to the deposition of the insulating material at operation 106. Additionally, it is understood that the first insulating material at operation 204 can be implemented in any manner similar to that described herein.

Figure 7:
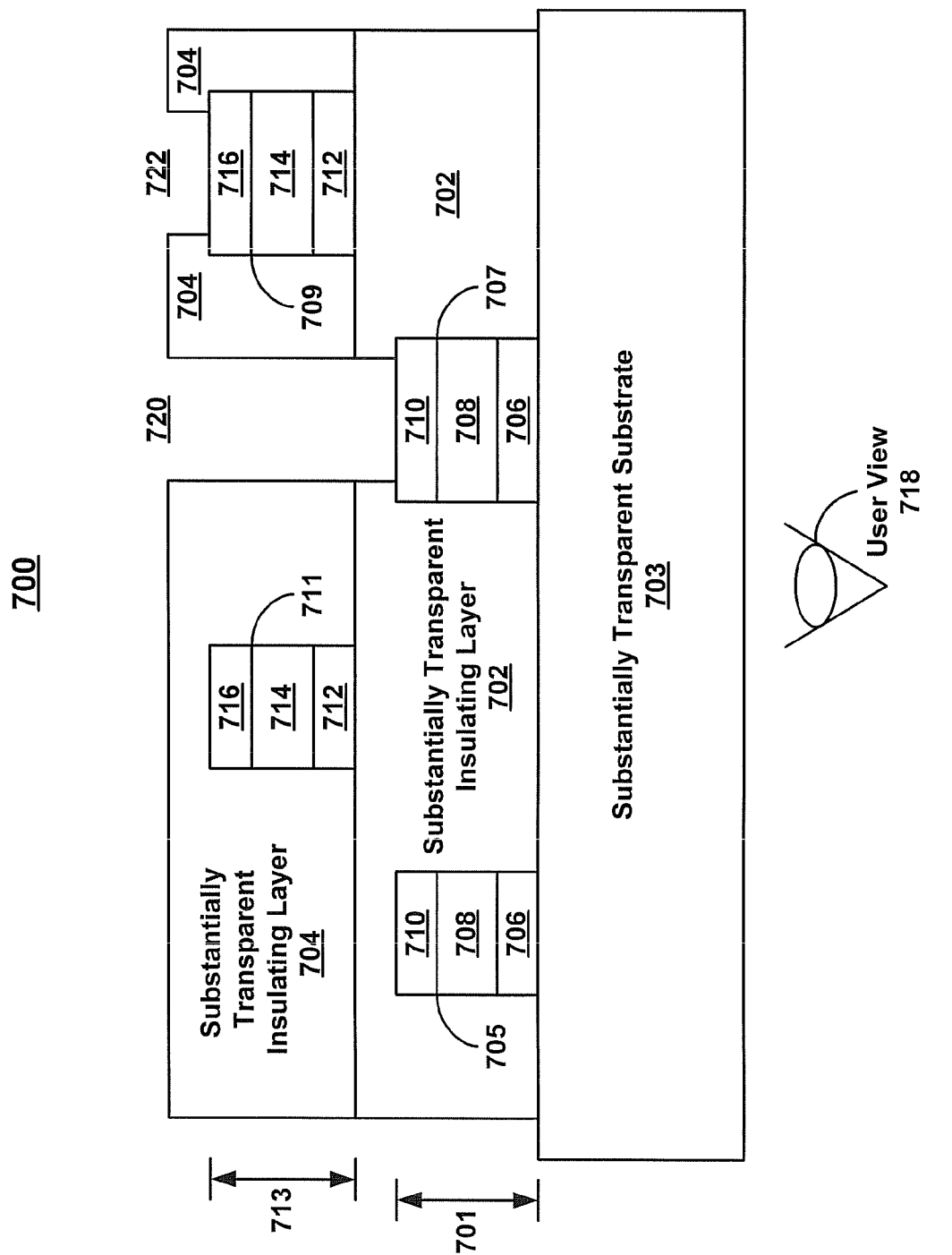
FIG. 7 is a cross sectional view of an exemplary capacitive sensing device in accordance with an embodiment of the present invention.
Figure 9:
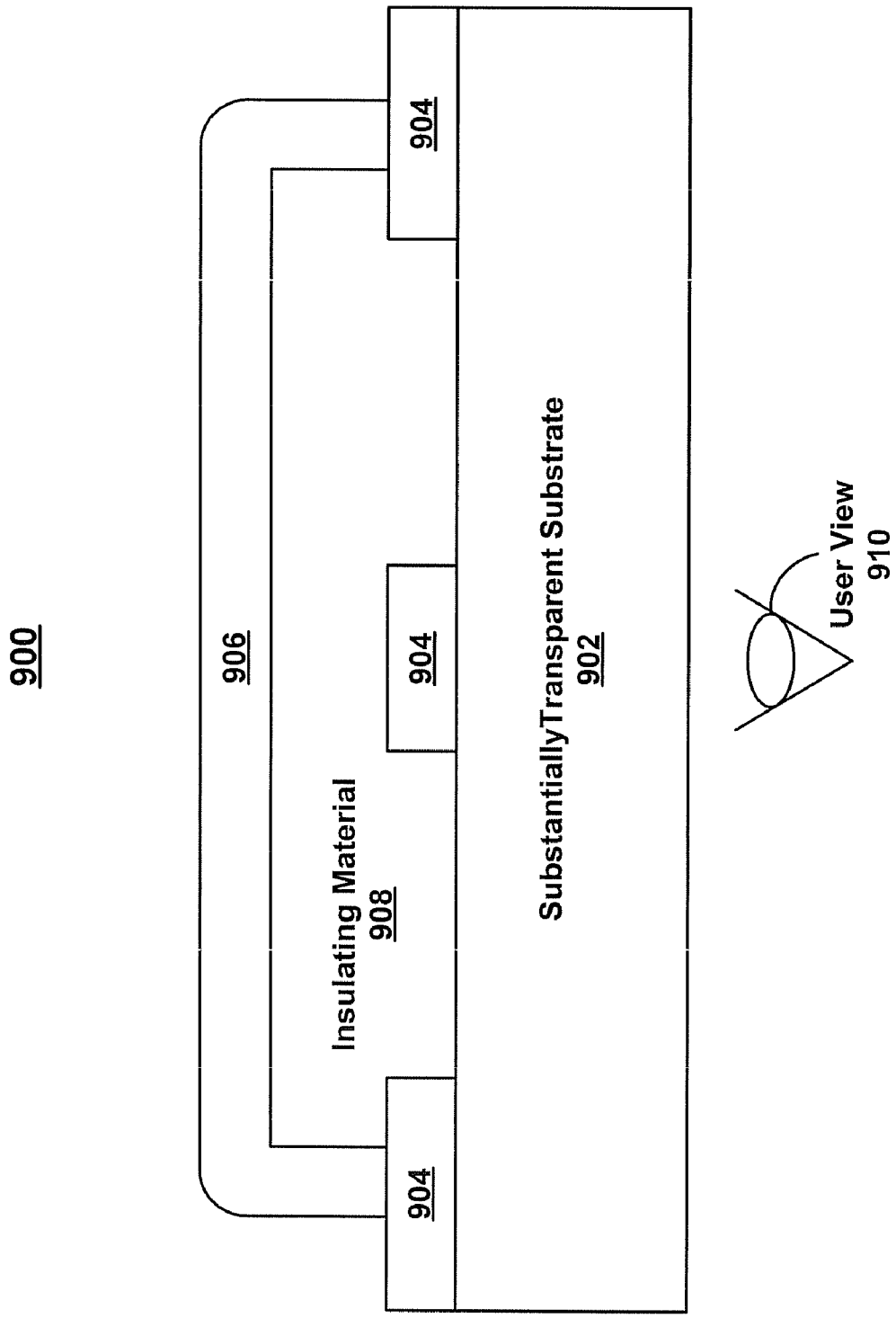
FIG. 9 is a cross sectional view of an exemplary capacitive sensing device in accordance with another embodiment of the present invention.
Figure 10:
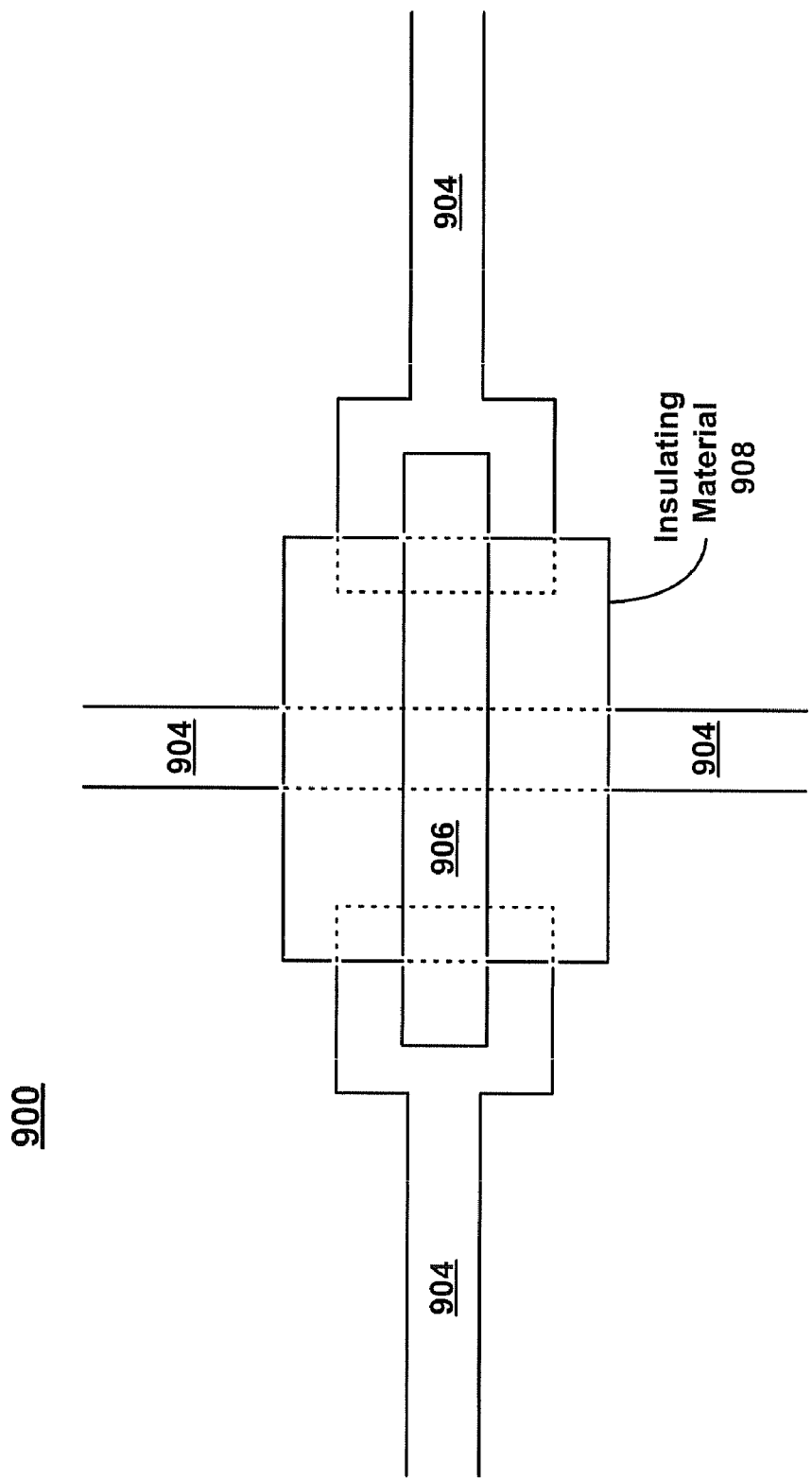
FIG. 10 is a top view of the capacitive sensing device of FIG. 9 in accordance with another embodiment of the present invention.

At operation 206, a second set of conductive traces are patterned above and coupled to the substantially transparent substrate. It is understood that the second set of conductive traces may be implemented in diverse ways. For example, the second set of conductive traces can be implemented in any manner similar to the set of conductive traces at operation 104, described herein. Alternatively, the second set of conductive traces may provide local bridges that electrically couple traces of the first set of conductive traces as shown in FIGS. 9 and 10. In another embodiment, the second set of traces can be a second layer above the first set of conductive traces as shown in FIG. 7.

At operation 208 of FIG. 2, a second insulating material is deposited above the second set of conductive traces. The deposition of the second insulating material at operation 208 may be implemented in a wide variety of ways. For example, the deposition of the second insulating material at operation 208 can be implemented in any manner similar to the deposition of the insulating material at operation 106. Furthermore, it is understood that the second insulating material at operation 208 can be implemented in any manner similar to that described herein. It is noted that the second insulating material deposited at operation 208 can act as protection for the second set of conductive traces and also provide them electrical insulation from the outside world. Alternatively, the second insulating material deposited at operation 208 can act as protection for the first and second sets of conductive traces and also provide them electrical insulation from the outside world. The deposition of the second insulating material at operation 208 may be an optional operation of flowchart 200. At the completion of operation 208, the process exits flowchart 200.

It is noted that any number of sets of conductive traces may be implemented in accordance with the present embodiment. For example, operations similar to operations 202 and/or 204 may be repeated as desired.

Figure 3:
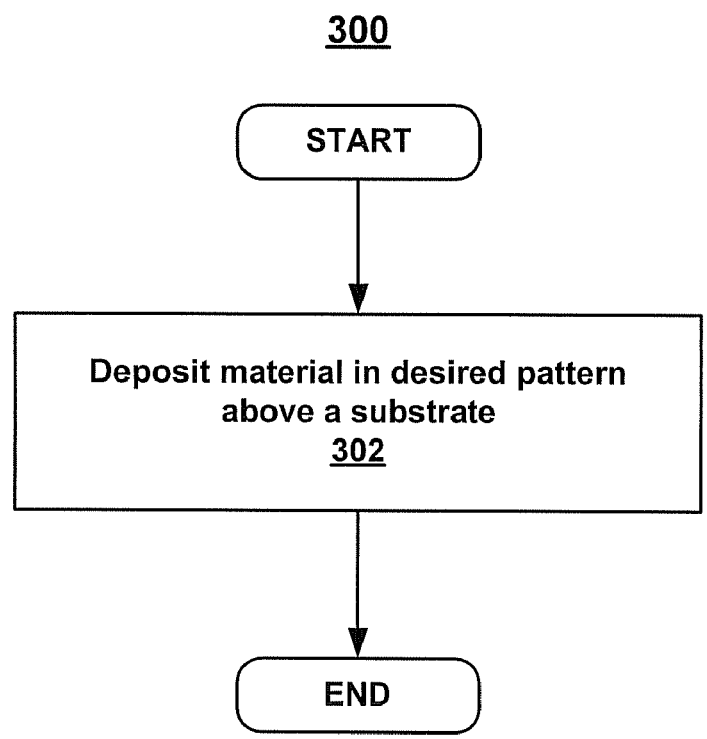
FIG. 3 is a flowchart of operations performed in accordance with an embodiment of the present invention for printing a material.
Figure 4:
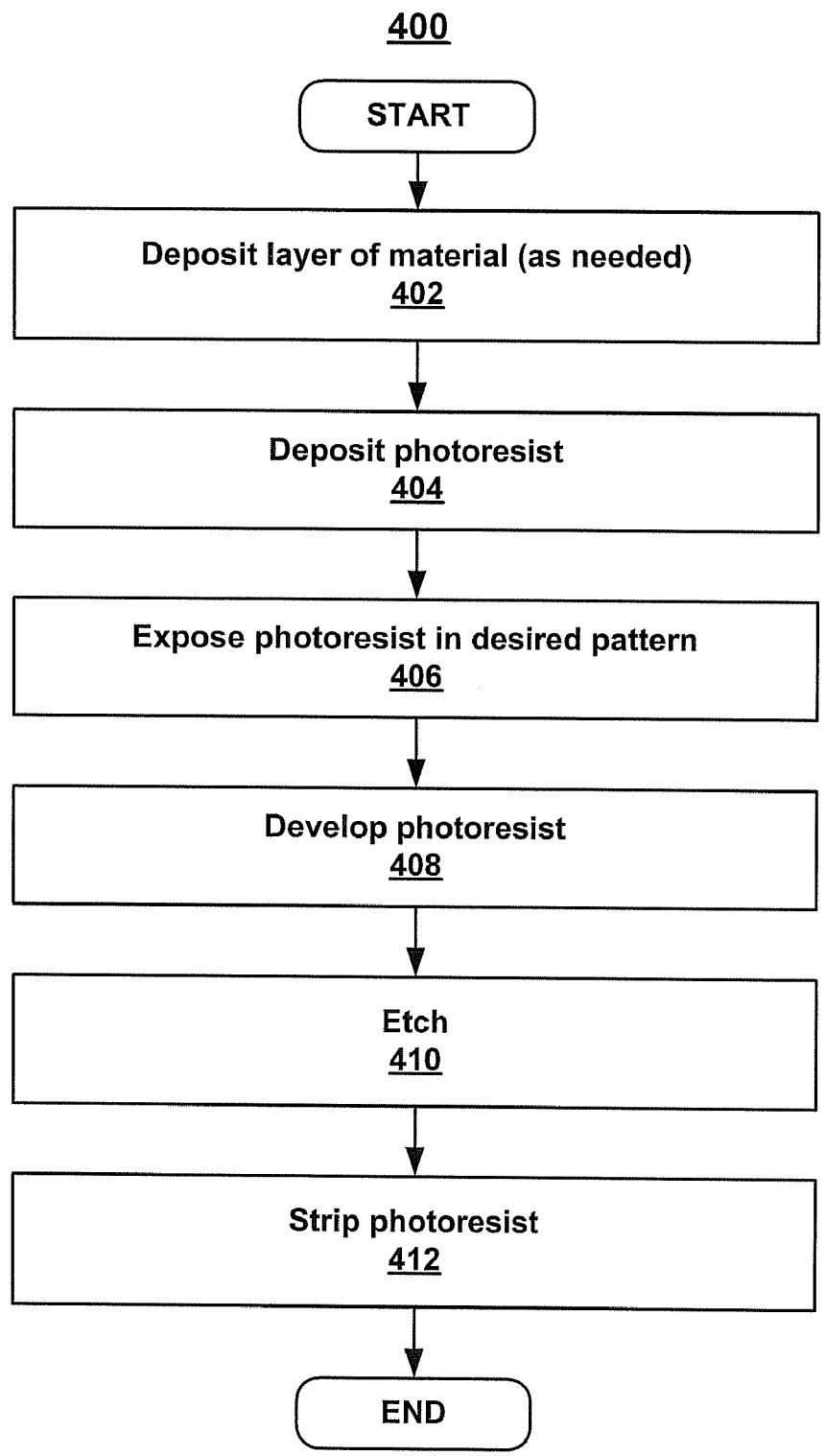
FIG. 4 is a flowchart of operations performed in accordance with an embodiment of the present invention for a photolithography/etching process.
Figure 5:
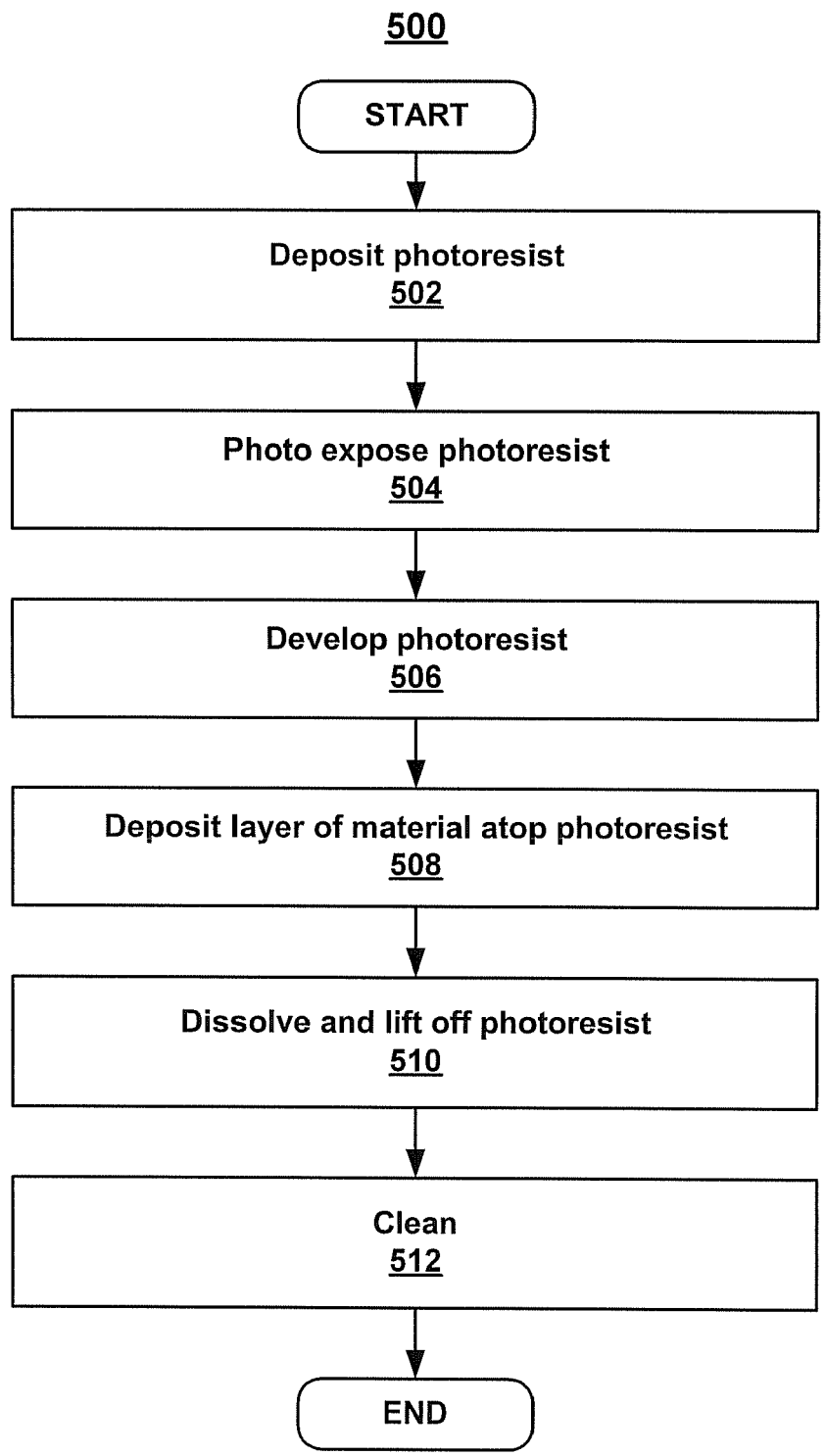
FIG. 5 is a flowchart of operations performed in accordance with an embodiment of the present invention for a liftoff process.

FIGS. 3, 4 and 5 are each a flowchart of an exemplary "patterning" operation that can be utilized in conjunction with embodiments of the present invention. It is understood that patterning can include any transference of a design to some type of surface (e.g., a substrate, a layer of material, multiple layers of material, and the like). FIGS. 3, 4 and 5 each represents a process that can be utilized in combination with, but is not limited to, flowcharts 100, 200 and 600 of FIGS. 1, 2 and 6, respectively. It is appreciated that FIGS. 3, 4 and 5 each represents a process that is well known by those of ordinary skill in the art. Further details with regard to these and other processes can be found in publications related to display or semiconductor manufacture; for example, "Microchip Fabrication: A Practical Guide to Semiconductor Processing" by Peter Van Zan, 4th edition (Apr. 3, 2000), McGraw-Hill Professional, ISBN: 0071356363, which is hereby incorporated by reference.

FIG. 3 is a flowchart 300 of an exemplary printing process in accordance with an embodiment of the present invention. Although specific operations are disclosed in flowchart 300, such operations are exemplary. That is, the present embodiment is well suited to performing various other operations or variations of the operations recited in FIG. 3.

At operation 302, material is deposited in a desired pattern above a substrate. It is appreciated that the deposition of the material in the desired pattern at operation 302 may be implemented in diverse ways. For example, material can be deposited in the desired pattern at operation 302 in a manner commonly referred to as a printing process that is well known by those of ordinary skill in the art. Furthermore, the deposited material may include diverse materials in accordance with the present embodiment. For example, the material may include, but is not limited to, a conductive material, a non-conductive material, an opaque material, a non-reflective material, an insulating material, a substantially transparent material and/or the like. The material at operation 302 may include one or more of the materials mentioned herein, but is not limited to such. Once operation 302 is completed, the process exits flowchart 300.

FIG. 4 is a flowchart 400 of an exemplary photolithography/etching process in accordance with an embodiment of the present invention. Although specific operations are disclosed in flowchart 400, such operations are exemplary. That is, the present embodiment is well suited to performing various other operations or variations of the operations recited in FIG. 4.

At operation 402, a layer of material is deposited above a substrate. Operation 402 is performed as needed, and need not be performed if the material to be etched at operation 410 is already present prior to patterning. The deposition of the material at operation 402 may be implemented in a wide variety of ways. For example, the deposition of the material at operation 402 can be implemented in any manner described herein, but is not limited to such. The layer of material at operation 402 may include a wide variety of materials. For example, the material can include, but is not limited to, any material described herein.

At operation 404 of FIG. 4, a photoresist is deposited above the layer of material. At operation 406, the photoresist is exposed to a particular pattern. At operation 408, the photoresist is developed. At operation 410, the material is etched in a manner to follow the pattern. At operation 412, the remaining photoresist is stripped, away. It is noted that operations 404, 406, 408, 410 and 412 may each be implemented in a wide variety of ways that are well known by those of ordinary skill in the art.

FIG. 5 is a flowchart 500 of an exemplary liftoff process in accordance with an embodiment of the present invention. Although specific operations are disclosed in flowchart 500, such operations are exemplary. That is, the present embodiment is well suited to performing various other operations or variations of the operations recited in FIG. 5.

At operation 502, a layer of photoresist is deposited above a substrate. The deposition of the photoresist at operation 502 may be implemented in a wide variety of ways. For example, the deposition of the photoresist at operation 502 can be implemented in any manner described herein, but is not limited to such.

At operation 504 of FIG. 5, the photoresist is exposed to a particular pattern.

At operation 506, the photoresist is developed. At operation 508, a layer of material is deposited atop the photoresist. At operation 510, the photoresist is dissolved and lifted off. At operation 512, a cleaning process is then performed. It is noted that operations 504, 506, 508, 510 and 512 may each be implemented in a wide variety of ways that are well known by those of ordinary skill the art.

Figure 6:
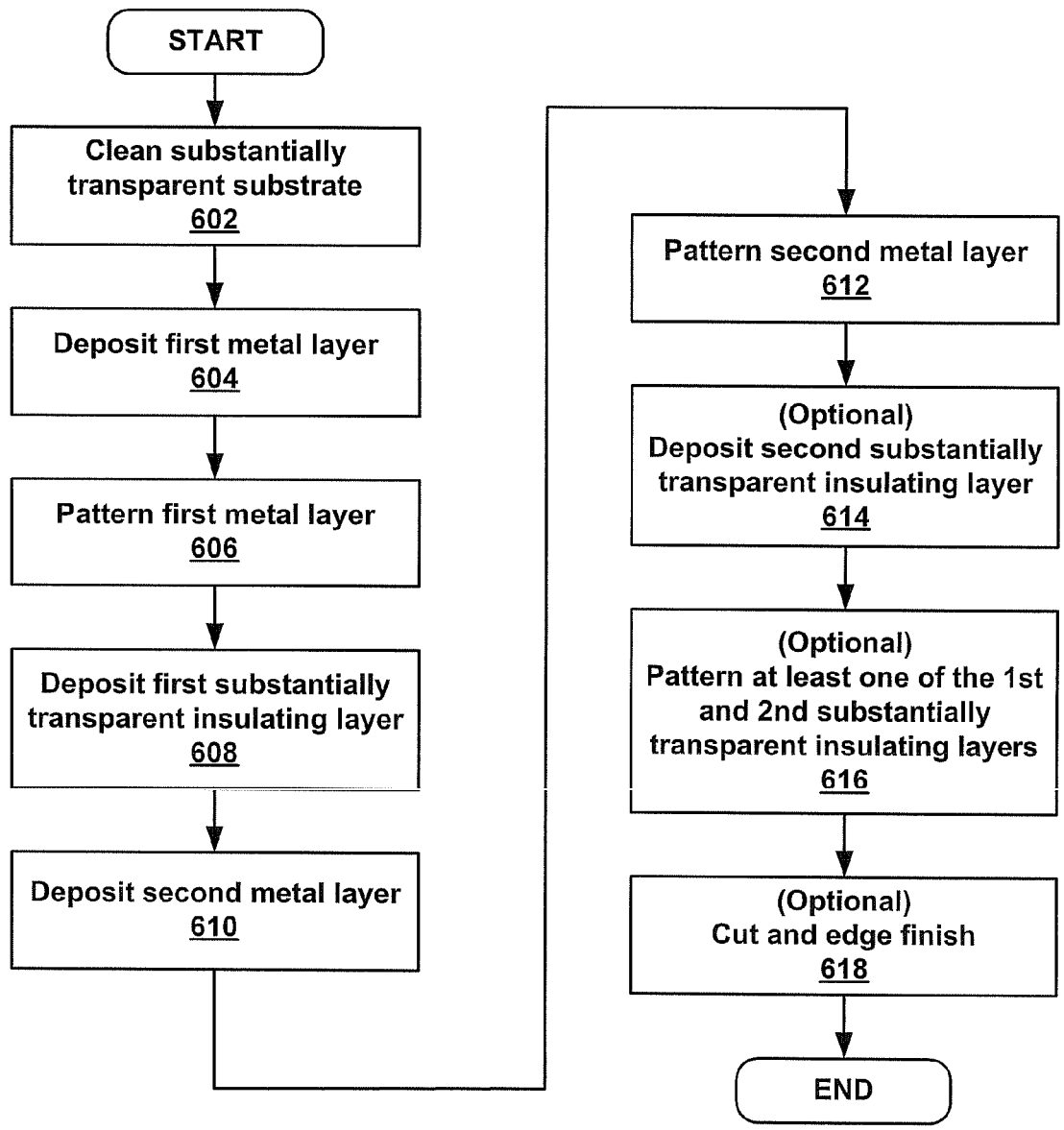
FIG. 6 is a flowchart of operations performed in accordance with an embodiment of the present invention for manufacturing a capacitive sensing device.

FIG. 6 is a flowchart 600 of operations performed in accordance with an embodiment of the present invention for manufacturing a capacitive sensing device. Although specific operations are disclosed in flowchart 600, such operations are exemplary. That is, the present embodiment is well suited to performing various other operations or variations of the operations recited in FIG. 6. For example, it is appreciated that the patterning operations of flowchart 600 can be performed in diverse ways. For example, if the material to be patterned is not deposited in a separate operation, the patterning of the first metal layer can include, but is not limited to, process 300, 400, or 500.

The present embodiment provides a method for manufacturing a capacitive sensing device. The capacitive sensing device includes a substantially transparent substrate having two metal layers which are separated by a substantially transparent insulating layer. Additionally, a second substantially transparent insulating layer can be optionally used in order to provide an abrasion resistance layer for the second metal layer and also provide them electrical insulation from the outside world. Each metal layer can be patterned to provide conductive traces that can be coupled to sensory circuitry (not shown) of a capacitive sensing device. Within the present embodiment, it is noted that there is typically no need for forming vias that couple one metal layer to the other. However, the first and second substantially transparent insulating layers are each patterned so that electrical contacts can be made to each of the metal layers.

At operation 602 of FIG. 6, a substantially transparent substrate (e.g., a glass, a plastic or a crystalline material) is cleaned. It is understood that there are a wide variety of ways at operation 602 for cleaning the substantially transparent substrate. For example, if the substantially transparent substrate is a glass, it can be aggressively cleaned at operation 602 with, but not limited to, ultrasonic nozzles, detergents, scrubbing brushes, thorough rinse and deionized water rinses. However, the cleaning of the substantially transparent substrate is not limited to such implementations.

At operation 604, a first metal layer is deposited above the substantially transparent substrate. It is understood that the deposition of the first metal layer can be implemented in a wide variety of ways. For example, the deposition of the first metal layer can be implemented utilizing, but not limited to, a sputtering process, an electron beam evaporation process or a resistive evaporation process. It is noted that the first metal layer can include diverse materials. For instance, the first metal layer can include, but is not limited to, black chrome (e.g., chromium oxynitride), aluminum, titanium, nickel, chromium, and the like. Optionally, other materials and/or a plurality of layers may be incorporated as part of the first metal layer for processing or other reasons. For example, a titanium layer may be included as part of the first metal layer to be utilized as an etch stop when patterning a substantially transparent insulating layer, described below. Additionally, gold may be utilized when a liftoff process (e.g., flowchart 500) is used. Moreover, gold may be utilized as part of the formation of a landing pad for sensing circuitry. Furthermore, a metal may be disposed between two other metals in the first metal layer to prevent corrosion. Alternatively, the first metal layer can include at least one layer of substantially opaque material. Moreover, the first metal layer can be formed of at least one layer of material that is substantially non-reflective. By locating the substantially non-reflective material such that it faces a user of the capacitive sensing device, it optically obscures from the user any reflective materials included as part of the first metal layer that will eventually become conductive traces.

At operation 606 of FIG. 6, the first metal layer is patterned above the substantially transparent substrate. It is appreciated that the patterning of the first metal layer may be performed at operation 606 in diverse ways. For example, the patterning of the first metal layer can include, but is not limited to, process 400. Furthermore, the patterning of the first metal layer can include, but is not limited to, a lithographic process, a printing process, electron beam lithography, screen printing, inkjet printing, offset printing, electroplating, stamping, and LIGA. Furthermore, the patterning of the first metal layer can include patterning a landing pad region above the substantially transparent substrate to enable coupling of one or more sensing circuit components to the substantially transparent substrate.

The patterning of the first metal layer at operation 606 forms a first set of conductive traces that are part of the capacitive sensing device. The first set of conductive traces may be implemented in diverse ways. For example, each of the first set of conductive traces can have a width such that the capacitive sensing device does not have to be arranged with respect to an underlying image in order to avoid deleterious obstruction of that underlying image by these conductive traces. The underlying image is separate from the capacitive sensing device. Additionally, the capacitive sensing device is fabricated separately from active components of an information display device. The first set of conductive traces can also be patterned such that each of them has a width less than approximately 12 micrometers. Alternatively, the first set of conductive traces can be patterned such that each of them has a width that does not require them to be formed of a substantially transparent material. Each of the first set of conductive traces can also be implemented with a width less than a pixel width of the underlying image. Also, each of the first set of conductive traces can be a capacitive sensing element. The first set of conductive traces at operation 606 is not limited in any way to these embodiments.

At operation 608 of FIG. 6, a first substantially transparent insulating material layer is deposited above the first set of conductive traces and the substantially transparent substrate. The substantially transparent insulating layer may be implemented in diverse ways. For example, at operation 610, a deposition of a dielectric material (e.g., $SiO_2$, Spin-On-Glass, and the like) can be the first substantially transparent insulating layer. The first insulating layer may be deposited at operation 608 to cover and insulate the first set of conductive traces or it may be deposited to cover and insulate one or more portions of the first set of conductive traces.

At operation 610, a second metal layer is deposited above the first substantially transparent insulating layer and the substantially transparent substrate. It is understood that the deposition of the second metal layer can be implemented in a wide variety of ways. For example, the deposition of the second metal layer can be implemented in any manner similar to that described herein with reference to the deposition at operation 604 of the first metal layer.

At operation 612 of FIG. 6, the second metal layer is patterned above the first substantially transparent insulating layer. It is appreciated that the patterning of the second metal layer may be performed at operation 612 in diverse ways. For example, the patterning of the second metal layer can be implemented in any manner similar to that described herein with reference to the patterning at operation 606 of the first metal layer. However, it is noted that the patterning mask of the second metal layer may be different from the patterning mask of the first metal layer. Additionally, if the patterning mask for the first metal layer dictated a set of traces substantially aligned along the horizontal axis, then the patterning mask for the second metal layer can dictate a set of traces substantially aligned along the vertical axis. It is appreciated that the patterning at operation 612 of the second metal layer forms a second set of conductive traces. As such, the second set of conductive traces can be implemented in any manner similar to that described herein with reference to the first set of conductive traces at operation 606. Moreover, the second set of conductive traces can be patterned at operation 606 such that they are substantially orthogonal to the first set of conductive traces.

At operation 614, a second substantially transparent insulating material layer is deposited above the second set of conductive traces and the first substantially transparent insulating layer. It is noted that the second substantially transparent insulating layer can act as a protective layer for the second set of conductive traces. Additionally, the second substantially transparent insulating layer can provide the second set of conductive traces electrical insulation from the outside world. The deposition of the second substantially transparent insulating layer at operation 614 can be an optional operation. The deposition of the second substantially transparent insulating layer at operation 614 may be implemented in diverse ways. For example, the deposition of the second substantially transparent insulating layer can be implemented in any manner similar to that described herein with reference to the deposition at operation 608 of the first substantially transparent insulating layer.

At operation 616 of FIG. 6, at least one of the first and second substantially transparent insulating layers is patterned above portions of the first and second sets of conductive traces in order to form pads where electronics of the capacitive sensing device can be coupled to the conductive traces. Furthermore, test pads can be formed outside of the sensing area of the capacitive sensing device to enable verification of the integrity of each conductive trace. It is appreciated that the patterning of the substantially transparent insulating layer(s) at operation 616 can be implemented in a wide variety of ways. For example, the patterning of the substantially transparent insulating layer(s) at operation 616 can be implemented in any manner of patterning similar to that described herein. It is noted that the patterning of the substantially transparent insulating layer(s) at operation 616 may include an etching process. For example, an etching at operation 616 of the substantially transparent insulating layer(s) can include a wet buffered hydrogen fluoride (HF) etchant. If this etching of the substantially transparent insulating layer(s) at operation 616 is above a titanium layer of either the first and/or second set of conductive traces, the titanium layer acts as an etch stop for the buffered hydrogen fluoride etchant. Therefore, the titanium layer is able to protect the other material layers (if any) of the first and/or second set of conductive traces.

Operation 616 can be an optional operation of flowchart 600. That is, if the first and second substantially transparent insulating layers can be deposited where it is desired, there is really no need to perform operation 616. For example, the first and second substantially transparent insulating layers can be deposited over the first and second set of conductive traces in such a manner as to leave exposed electrical contact pad areas of the first and second sets of conductive traces to enable coupling of test equipment and/or sensing circuitry of the capacitive sensing device.

At operation 618, if several capacitive sensing devices are being manufactured on a single substantially transparent substrate, the substantially transparent substrate can be cut to separate the capacitive sensing devices. It is appreciated that the cutting at operation 618 can be implemented in diverse ways. For example, a small rotary wheel can be used to roll across the substantially transparent substrate to scratch its surface to enable it to be broken or separated along the scratches. Alternatively, a laser can be used to move across the substantially transparent substrate to provide enough thermal expansion to cut it. However, either of these cutting techniques leaves a fairly square edge that can easily be chipped. As such, each of the cut edges (and others if desired) of the substantially transparent substrate can be edge ground at operation 618 in order to protect the edges of the capacitive sensing device from casual contact damage. The edge grind at operation 618 can be performed to create 45 degree bevels along the desired edges of the substantially transparent substrate. Furthermore, at operation 618, the dust created by the edge grinding can also be washed away. Once operation 618 is completed, the process exits flowchart 600. It is noted that operation 618 can be an optional operation of flowchart 600. For example, if a single capacitive sensing device is being manufactured on a single substantially transparent substrate, there may not be a need to perform operation 618.

FIG. 7 is a cross sectional view of an exemplary capacitive sensing device 700 in accordance with an embodiment of the present invention. It is appreciated that capacitive sensing device 700 may have been manufactured utilizing the process represented by flowchart 200 of FIG. 2 or flowchart 600 of FIG. 6. Specifically, capacitive sensing device 700 includes a substantially transparent substrate 703 having metal layers 701 and 713 which are separated by a substantially transparent insulating material layer 702. Additionally, a second substantially transparent insulating material layer 704 can be used in order to provide an abrasion resistance layer for metal layer 713. Metal layers 701 and 713 have each been patterned to provide conductive traces 705, 707, 709 and 711 that can be coupled to sensory circuitry (not shown) of capacitive sensing device 700. It is understood that conductive traces 707 and 709 may also be referred to as electrical contact pads that are located outside of the sensing area (not shown) of capacitive sensing device 700. It is noted that substantially transparent insulating layers 702 and 704 are each patterned so that electrical contacts can be made to metal layers 701 and 713.

Within the present embodiment, conductive traces 705 and 707 have been deposited and patterned above the substantially transparent substrate 703. It is noted that conductive traces 705 and 707 each includes three layers of material. Specifically, conductive traces 705 and 707 each includes a layer of black chrome 706, a layer of aluminum 708 and a layer of titanium 710. Additionally, substantially transparent insulating layer 702 has been deposited above conductive traces 705 and 707 and substantially transparent substrate 703.

Within FIG. 7, conductive traces 709 and 711 have been deposited and patterned above the substantially transparent insulating layer 702. It is appreciated that conductive traces 709 and 711 each includes three layers of material. Specifically, conductive traces 709 and 711 each includes a layer of black chrome 712, a layer of aluminum 714 and a layer of titanium 716. Furthermore, substantially transparent insulating layer 704 has been deposited above conductive traces 709 and 711 and substantially transparent insulating layer 702.

The substantially transparent insulating layer 704 of the capacitive sensing device 700 has been patterned to form an opening 722 above conductive trace 709. Moreover, substantially transparent insulating layers 704 and 702 have been patterned to form an opening 720 above conductive trace 707. As such, electrical contact may be made with metal layers 701 and 713. It is noted that openings 720 and 722 can be located on or near the perimeter of substantially transparent substrate 703. A user view 718 represents the direction from which users can view the capacitive sensing device 700. As such, an underlying image or an information display device (not shown) could be located behind the capacitive sensing device 700 facing the user view 718. In this manner, a user would be viewing the underlying image or information display device through capacitive sensing device 700. Within the present embodiment, capacitive sensing device 700 is separate from active components used to comprise the information display device.

Within FIG. 7, it is appreciated that aluminum layer 708 and titanium layer 710 of conductive traces 705 and 707 are hidden or obscured by black chrome layer 706 (e.g., chromium oxynitride). Furthermore, aluminum layer 714 and titanium layer 716 of conductive traces 711 and 709 are hidden or obscured by black chrome layer 712. If black chrome layers 706 and 712 were not included within capacitive sensing device 700, aluminum layers 708 and 714 may reflect unwanted ambient light towards the user. As such, a black matrix material (e.g., black chrome layers 706 and 712) is placed between the reflective conductive traces (e.g., 708 and 714) and the user of capacitive sensing device 700. The black chrome layers 706 and 712 have low reflectance and high absorbency so that they appear black and return little of the light that impinge onto them. A reactive sputtering of chromium with oxygen and nitrogen can be used to create black chrome layers 706 and 712. However, other metals and organics like polyimide can also be used to form light absorbing black matrix layers like black chrome layers 706 and 712. Within one embodiment, black chrome layers 706 and 712 may each be deposited at a depth of 50-100 nanometers (nm) while aluminum layers 708 and 714 may each be deposited at a depth of 1000 nm. Additionally, titanium layers 710 and 716 may each be deposited at a depth of 50 nm. The three materials may be patterned with substantially the same pattern as described herein. Conversely, each layer of the conductive traces 705, 707, 709 and 711 may be patterned with a different pattern.

It is noted that user view 718 can be on the other side of capacitive sensing device 700. In response to this reposition, some change may be made to capacitive sensing device 700. For example, black chrome layers 706 and 712 would be patterned on the side closest to the repositioned user view 718. As such, titanium layers 710 and 716 can be excluded since the chromium could act as the etch stop depending on the type of etchant used on the substantially transparent insulating layers 702 and 704. Moreover, some chromium or tungsten may be deposited on the substantially transparent substrate to provide an adhesion layer for the aluminum layer 708.

Figure 8:
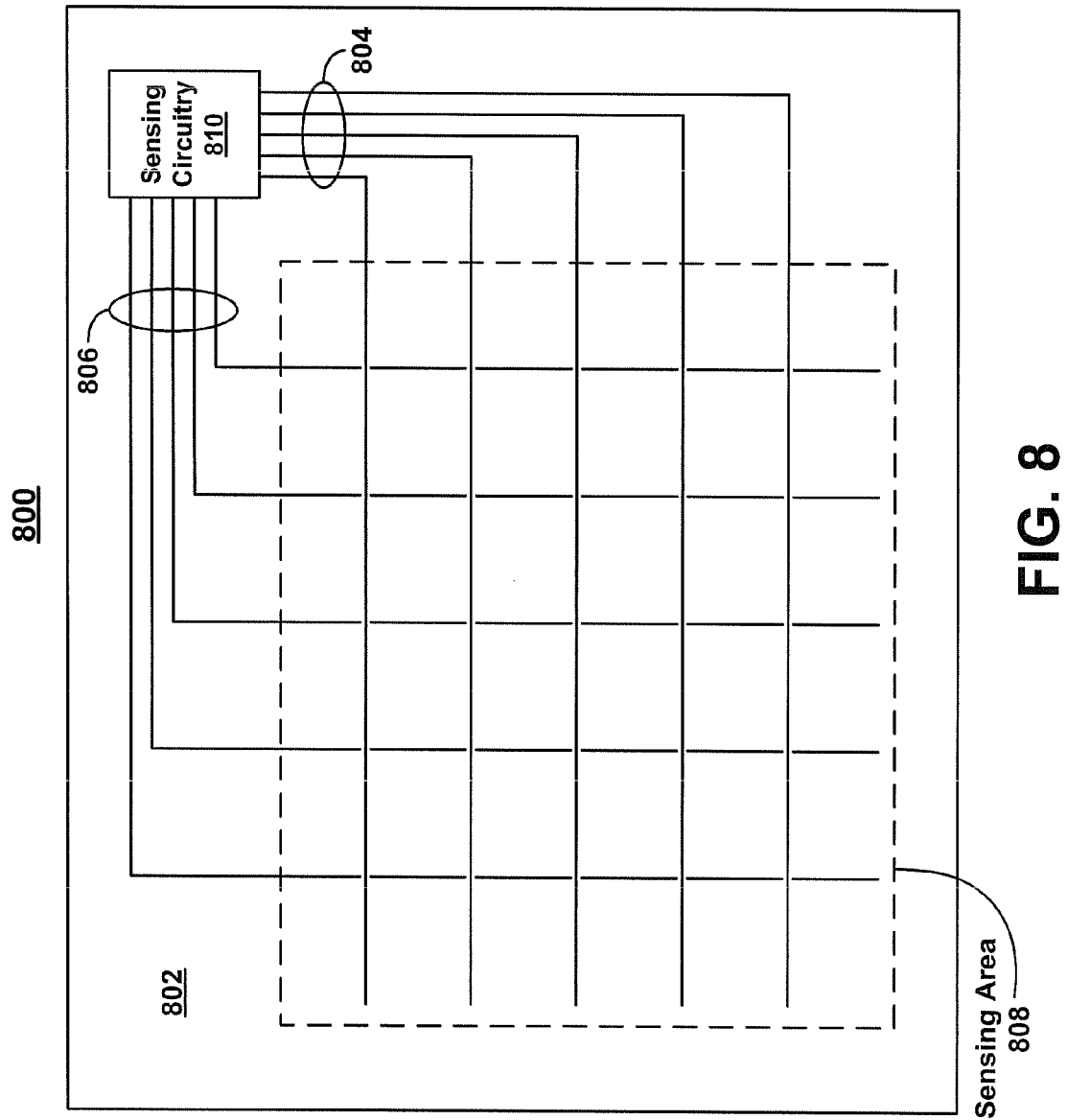
FIG. 8 is a plan view of an exemplary capacitive sensing device in accordance with an embodiment of the present invention.

FIG. 8 is a plan view of an exemplary capacitive sensing device 800 in accordance with an embodiment of the present invention. It is appreciated that capacitive sensing device 800 may have been manufactured utilizing the process represented by flowchart 200 of FIG. 2 or flowchart 600 of FIG. 6. Specifically, capacitive sensing device 800 includes a substantially transparent substrate 802 having a first set of conductive traces 806 patterned thereon. Additionally, a second set of conductive traces 804 have been patterned above conductive traces 806 and substantially transparent substrate 802. As such, the combination of conductive traces 804 and 806 form a sensing area 808 of capacitive sensing device 800. Furthermore, conductive traces 804 and 806 are each coupled to sensing circuitry 810 that enables the operation of capacitive sensing device 800. It is noted that capacitive sensing device 800 can be placed over an underlying image or an information display device (not shown). As such, a user would view the underlying image or information display by looking through sensing area 808 of capacitive sensing device 800 as shown.

FIG. 9 is a cross sectional view of an exemplary capacitive sensing device 900 in accordance with another embodiment of the present invention. It is appreciated that capacitive sensing device 900 may have been manufactured utilizing the process represented by flowchart 200 of FIG. 2 or flowchart 600 of FIG. 6. Specifically, a second set of conductive traces 906 of capacitive sensing device 900 have been patterned to provide local bridges that electrically couple particular traces of a first set of conductive traces 904. As such, an insulating material 908 is utilized to support the local bridges of the second set of conductive traces 906 while electrically insulating the second set of conductive traces 906 from particular traces of the first set of conductive traces 904.

Within FIG. 9, the capacitive sensing device 900 includes a substantially transparent substrate 902 having a first set of conductive traces 904 patterned thereon. A user view 910 represents the direction from which users can view the capacitive sensing device 900. As such, an underlying image or an information display device (not shown) could be located behind the capacitive sensing device 900 facing the user view 910. In this manner, a user would be viewing the underlying image or information display device through capacitive sensing device 900. Within the present embodiment, capacitive sensing device 900 is separate from active components used to comprise the information display device.

FIG. 10 is a top view of capacitive sensing device 900 of FIG. 9 in accordance with an embodiment of the present invention. The conductive trace 906 of capacitive sensing device 900 provides a local bridge that electrically couples particular traces of the first set of conductive traces 904.

Notice that the insulating material 908 electrically insulates the conductive trace 906 that bridges over one or the conductive traces 904. It is noted that insulating material 908 can be opaque if the size or shape of the area of coverage of insulating material 908 is such that the capacitive sensing device 900 does not have to be arranged with respect to an underlying image in order to avoid substantial deleterious obstruction of the underlying image by insulating material 908. By fabricating the capacitive sensing device 900 in the manner shown in FIGS. 9 and 10, fabrication costs can be reduced since less insulating material 908 is utilized to insulate the first set of conductive traces 904 from the second set of conductive traces 906. Additionally, the weight of the capacitive sensing device 900 can be reduced since less material is used during its fabrication.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A capacitive sensing device comprising:
    a substantially transparent substrate; and
    a first set of patterned conductive traces formed above said substantially transparent substrate, said first set of conductive traces comprising a plurality of layers, at least one of said plurality of layers comprising a material that is substantially non-reflective and optically absorbent, and at least another of said plurality of layers being a substantially opaque material, each of said first set of patterned conductive traces having a width such that said capacitive sensing device does not have to be arranged with respect to an underlying image in order to avoid deleterious obstruction of said underlying image by said first set of patterned conductive traces, said underlying image is separate from said capacitive sensing device, wherein said capacitive sensing device is separate from active components used to comprise an information display device.

2. The capacitive sensing device as described in claim 1, further comprising:
    a second set of patterned conductive traces formed and coupled to said substantially transparent substrate.

3. The capacitive sensing device as described in claim 2, wherein each of said second set of patterned conductive traces has a width such that said capacitive sensing device does not have to be arranged with respect to an underlying image in order to avoid deleterious obstruction of said underlying image by said second set of patterned conductive traces.

4. The capacitive sensing device as described in claim 2, further comprising:
    an insulating material coupled between said first set of patterned conductive traces and said second set of patterned conductive traces.

5. The capacitive sensing device as described in claim 4, wherein said insulating material is substantially transparent.

6. The capacitive sensing device as described in claim 1, wherein each of said first set of patterned conductive traces has a width less than approximately 12 micrometers.

7. The capacitive sensing device as described in claim 1, wherein each of said first set of patterned conductive traces has a width such that each of said first set of patterned conductive traces is not required to be formed of a substantially transparent material.

8. The capacitive sensing device as described in claim 1, wherein each of said first set of patterned conductive traces has a width less than a width of a pixel of said underlying image.

9. The capacitive sensing device as described in claim 1, wherein each of said first set of patterned conductive traces is a capacitive sensing element.

10. The capacitive sensing device as described in claim 1, wherein said substantially transparent substrate is a component of said information display device.

11. The capacitive sensing device as described in claim 1, wherein said substantially transparent substrate is selected from a group consisting of:
    a glass, a plastic, and a crystalline material.

12. The capacitive sensing device as described in claim 2, wherein said second set of patterned conductive traces is formed of at least one layer of material that is substantially opaque.

13. The capacitive sensing device as described in 2, wherein said second set of patterned conductive traces is formed of at least one layer of material that is substantially non-reflective and optically absorbent.

14. The capacitive sensing device as described in claim 1, further comprising:
    a landing pad region formed above said substantially transparent substrate for coupling a sensing circuit component to said substantially transparent substrate.

15. A method for fabricating a capacitive sensing device, said method comprising:
    utilizing a substantially transparent substrate; and
    patterning a first set of conductive traces above said substantially transparent substrate, said first set of conductive traces comprising a plurality of layers, at least the layer facing toward a user of the capacitive sensing device, of said plurality of layers, comprising a material that is substantially non-reflective and optically absorbent, and at least another of said plurality of layers comprising a substantially opaque material, each of said first set of conductive traces having a width such that said capacitive sensing device does not have to be arranged with respect to an underlying image in order to avoid deleterious obstruction of said underlying image by said first set of conductive traces, said underlying image is separate from said capacitive sensing device, wherein said capacitive sensing device is fabricated separately from active components of an information display.

16. The method as described in claim 15, wherein said patterning said first set of conductive traces comprises a process selected from the group consisting of:
    a lithographic process, a printing process, electron beam lithography, screen printing, inkjet printing, offset printing, electroplating, stamping, and LIGA.

17. The method as described in claim 15, further comprising:
    patterning a second set of conductive traces above and coupled to said substantially transparent substrate.

18. The method as described in claim 17, wherein each of said second set of conductive traces has a width such that said capacitive sensing device does not have to be arranged with respect to said underlying image in order to avoid deleterious obstruction of said underlying image by said second set of conductive traces.

19. The method as described in claim 17, wherein said patterning said second set of conductive traces comprises a process selected from the group consisting of:
a lithographic process, a printing process, electron beam lithography, screen printing, inkjet printing, offset printing, electroplating, stamping, and LIGA.

20. The method as described in claim 17, wherein said first set of conductive traces and said second set of conductive traces are substantially orthogonal to each other.

21. The method as described in claim 17, wherein said second set of conductive traces comprises at least one layer of substantially opaque material.

22. The method as described in claim 17, further comprising:
depositing an insulating material above at least a portion of said first set of conductive traces.

23. The method as described in claim 17, wherein said insulating material is substantially transparent.

24. The method as described in claim 17, wherein said second set of conductive traces is formed of at least one layer of material that is substantially non-reflective and optically absorbent.

25. The method as described in claim 17, wherein said patterning said second set of conductive traces comprises:
patterning a landing pad region above said substantially transparent substrate for coupling a sensing circuit component to said substantially transparent substrate.

26. The method as described in claim 15, wherein said substantially transparent substrate is a component of said information display device.

27. The method as described in claim 15, wherein said substantially transparent substrate is selected from a group consisting of:
a glass, a plastic, and a crystalline material.

28. The method as described in claim 15, wherein said patterning said first set of conductive traces comprises:
patterning a landing pad region above said substantially transparent substrate for coupling a sensing circuit component to said substantially transparent substrate.

29. The method as described in claim 15, wherein each of said first set of conductive traces has a width less than approximately 12 micrometers.

30. The method as described in claim 15, wherein each of said first set of conductive traces has a width such that each of said first set of conductive traces is not required to be formed of a substantially transparent material.

31. The method as described in claim 15, wherein each of said first set of conductive traces has a width less than a pixel width of said underlying image.

32. The method as described in claim 15, wherein each of said first set of conductive traces is a capacitive sensing element.

33. A capacitive sensing device formed by a process comprising:
utilizing a substantially transparent substrate; and
using a first patterning process to generate a first plurality of conductive traces above said substantially transparent substrate, said first set of conductive traces comprising a plurality of layers, at least the layer facing toward a user of the capacitive sensing device, of said plurality of layers, comprising a material that is substantially non-reflective and optically absorbent, and at least another of said plurality of layers comprising a substantially opaque material, said first patterning process generating each of said first plurality of conductive traces having a width such that said capacitive sensing device does not have to be arranged with respect to an underlying image in order to avoid deleterious obstruction of said underlying image by said first plurality of conductive traces, said underlying image is separate from said capacitive sensing device, wherein said capacitive sensing device is formed separately from active components of an information display.

34. The capacitive sensing device as described in claim 33, wherein said first patterning process is selected from the group consisting of:
a lithographic process, a printing process, electron beam lithography, screen printing, inkjet printing, offset printing, electroplating, stamping, and LIGA.

35. The capacitive sensing device as described in claim 33, further comprising:
using a second patterning process to generate a second plurality of conductive traces above and coupled to said substantially transparent substrate.

36. The capacitive sensing device as described in claim 35, wherein said second patterning process generates each of said second plurality of conductive traces has a width such that said capacitive sensing device does not have to be arranged with respect to said underlying image in order to avoid deleterious obstruction of said underlying image by said second plurality of conductive traces.

37. The capacitive sensing device as described in claim 35, wherein said first patterning process and said second patterning process are each selected from the group consisting of:
a lithographic process, a printing process, electron beam lithography, screen printing, inkjet printing, offset printing, electroplating, stamping, and LIGA.

38. The capacitive sensing device as described in claim 35, wherein said first plurality of conductive traces and said second plurality of conductive traces are substantially orthogonal to each other.

39. The capacitive sensing device as described in claim 35, wherein said second plurality of conductive traces comprises at least one layer of substantially opaque material.

40. The capacitive sensing device as described in claim 35, wherein said second plurality of conductive traces is formed of at least one layer of material that is substantially non-reflective and optically absorbent.

41. The capacitive sensing device as described in claim 33, further comprising:
depositing an insulating material above at least a portion of said first plurality of conductive traces.

42. The capacitive sensing device as described in claim 41, wherein said insulating material is substantially transparent.

43. The capacitive sensing device as described in claim 33, wherein said substantially transparent substrate is a component of said information display device.

44. The capacitive sensing device as described in claim 33, wherein said substantially transparent substrate is selected from a group consisting of:
a glass, a plastic, and a crystalline material.

45. The capacitive sensing device as described in claim 33, further comprising:
generating a landing pad region above said substantially transparent substrate for coupling a sensing circuit component to said substantially transparent substrate.

46. The capacitive sensing device as described in claim 45, wherein said generating said landing pad region is performed during said first patterning process or said second patterning process.

47. The capacitive sensing device as described in claim 33, wherein each of said first plurality of conductive traces has a width less than approximately 12 micrometers.

48. The capacitive sensing device as described in claim 33, wherein each of said first plurality of conductive traces has a width such that each of said first plurality of conductive traces is not required to be formed of a substantially transparent material.

49. The capacitive sensing device as described in claim 33, wherein each of said first plurality of conductive traces has a width less than a pixel width of said underlying image.

50. The capacitive sensing device as described in claim 33, wherein each of said first plurality of conductive traces is a capacitive sensing element.

* * * * *